(12) United States Patent
Vonwiller et al.

(10) Patent No.: US 8,282,722 B2
(45) Date of Patent: *Oct. 9, 2012

(54) GALLIUM NAPHTHALOCYANINE SALTS EXHIBITING REDUCED KOGATION

(75) Inventors: Simone Charlotte Vonwiller, Balmain (AU); Sutharsiny Indusegaram, Balmain (AU); Graciel Gonzaga, Balmain (AU); Damon Donald Ridley, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.
This patent is subject to a terminal disclaimer.

(21) Appl. No.: 13/225,481

(22) Filed: Sep. 5, 2011

(65) Prior Publication Data
US 2011/0316936 A1    Dec. 29, 2011

Related U.S. Application Data

(63) Continuation of application No. 12/466,337, filed on May 14, 2009, now Pat. No. 8,029,611.

(51) Int. Cl.
*C09D 11/02* (2006.01)
*C09B 47/04* (2006.01)
*B41J 2/01* (2006.01)

(52) U.S. Cl. ............... 106/31.49; 106/31.43; 540/122; 540/133; 347/100

(58) Field of Classification Search ............... 106/31.49, 106/31.43; 540/122, 133; 347/100; 428/195.1
See application file for complete search history.

(56) References Cited

U.S. PATENT DOCUMENTS
3,986,827 A    10/1976    Dombchik
(Continued)

FOREIGN PATENT DOCUMENTS
EP    0564146 B1    3/1997
(Continued)

OTHER PUBLICATIONS

Dymetman, M., and Copperman, M., "Intelligent Paper in Electronic Publishing, Artist Imaging, and Digital Typography, Proceedings of EP '98", Mar.-Apr. 1998, Springer Verlag LNCS 1375, pp. 392-406.

*Primary Examiner* — Helene Klemanski

(57) ABSTRACT

A sulfonated dye salt of formula (II):

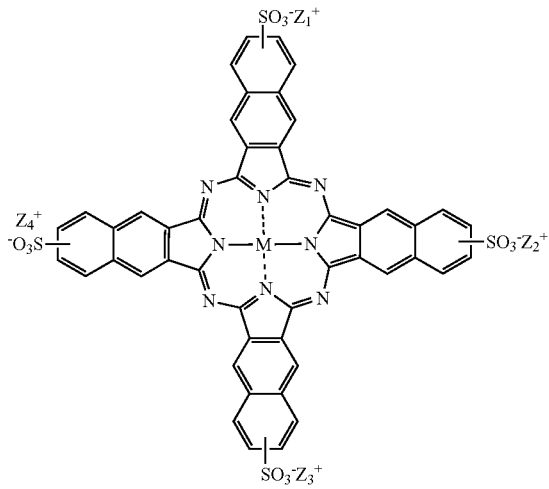

wherein
M is $Ga(A^1)$;
$A^1$ is an axial ligand selected from the group consisting of: —OH and halogen; and
$Z_1^+$, $Z_2^+$, $Z_3^+$ and $Z_4^+$ are independently selected from the group consisting of: H and an ammonium cation including 3 or more hydroxyl groups. At least one of $Z_1^+$, $Z_2^+$, $Z_3^+$ and $Z_4^+$ is the ammonium cation. Such salts exhibit reduced kogation in thermal bubble-forming inkjet printheads.

13 Claims, 2 Drawing Sheets

U.S. PATENT DOCUMENTS

| | | |
|---|---|---|
| 4,864,618 A | 9/1989 | Wright et al. |
| 4,988,805 A | 1/1991 | Kunde |
| 5,051,736 A | 9/1991 | Bennett et al. |
| 5,288,294 A | 2/1994 | Kaser |
| 5,477,012 A | 12/1995 | Sekendur |
| 5,652,412 A | 7/1997 | Lazzouni et al. |
| 5,661,506 A | 8/1997 | Lazzouni et al. |
| 5,692,073 A | 11/1997 | Cass |
| 5,704,969 A | 1/1998 | Kanaya et al. |
| 5,783,710 A | 7/1998 | Bauer et al. |
| 5,852,434 A | 12/1998 | Sekendur |
| 5,891,227 A | 4/1999 | Hoffmann et al. |
| 6,031,083 A | 2/2000 | Kunde et al. |
| 6,076,734 A | 6/2000 | Dougherty et al. |
| 6,432,185 B1 | 8/2002 | Bauer et al. |
| 6,464,768 B1 | 10/2002 | Bauer et al. |
| 6,758,890 B2 | 7/2004 | Matsuzaki et al. |
| 6,964,374 B1 | 11/2005 | Djuknic et al. |
| 7,122,076 B2 | 10/2006 | Vonwiller et al. |
| 7,148,345 B2 | 12/2006 | Vonwiller et al. |
| 7,566,363 B2 | 7/2009 | Starling et al. |
| 7,699,920 B2 | 4/2010 | Vonwiller et al. |
| 8,029,611 B2 * | 10/2011 | Vonwiller et al. .......... 106/31.43 |
| 2009/0199352 A1 | 8/2009 | Indusegaram et al. |
| 2009/0202799 A1 | 8/2009 | Indusegaram et al. |

FOREIGN PATENT DOCUMENTS

| | | |
|---|---|---|
| EP | 0719847 B1 | 7/2000 |
| EP | 1247846 A1 | 10/2002 |
| GB | 1107639 A | 3/1968 |
| GB | 2306669 A | 5/1997 |
| JP | 02-024367 A | 1/1990 |
| WO | WO 99/18487 A2 | 4/1999 |
| WO | WO 99/50787 | 10/1999 |
| WO | WO 03/066938 A2 | 8/2003 |

* cited by examiner

GALLIUM NAPHTHALOCYANINE SALTS EXHIBITING REDUCED KOGATION

CROSS REFERENCE TO RELATED APPLICATIONS

The present application is a Continuation Application of U.S. application Ser. No. 12/466,337 filed May 14, 2009, now issued U.S. Pat. No. 8,029,611, which is herein incorporated by reference.

FIELD OF THE INVENTION

The present application relates to sulfonated dyes suitable for printing inks, such as inkjet inks. It has been developed primarily for reducing kogation of such dyes in an inkjet printhead.

CO-PENDING APPLICATIONS

The following applications have been filed by the Applicant:

U.S. Ser. No. 12/368,305 U.S. Pat. No. 8,038,737

The disclosures of these co-pending applications are incorporated herein by reference.

CROSS-REFERENCES TO RELATED APPLICATIONS

The following patents or patent applications filed by the applicant or assignee of the present invention are hereby incorporated by cross-reference.

| | | | | |
|---|---|---|---|---|
| 10/815,635 | 7,357,323 | 7,605,940 | 7,506,168 | 7,905,401 |
| 7,457,961 | 7,457,007 | 6,902,255 | 7,204,941 | 7,278,727 |
| 7,423,145 | 7,122,076 | 7,148,345 | 7,658,792 | 7,837,775 |
| 7,416,280 | 6,755,509 | 7,156,289 | 7,721,948 | 6,720,985 |
| 7,295,839 | 7,593,899 | 7,068,382 | 7,094,910 | 7,062,651 |
| 6,644,642 | 6,549,935 | 6,987,573 | 6,727,996 | 6,760,119 |
| 7,064,851 | 6,290,349 | 6,428,155 | 6,785,016 | 6,831,682 |
| 6,741,871 | 6,965,439 | 7,663,780 | 6,870,966 | 6,474,888 |
| 6,724,374 | 6,788,982 | 7,263,270 | 6,788,293 | 6,737,591 |
| 7,369,265 | 10/778,056 | 11/193,482 | 7,055,739 | 6,830,196 |
| 7,182,247 | 7,082,562 | 7,918,404 | 7,108,192 | 12/025,746 |
| 12/025,762 | 12/025,765 | 10/492,169 | 7,469,062 | 7,359,551 |
| 7,444,021 | 7,308,148 | 6,957,768 | 7,170,499 | 11/856,061 |
| 7,762,453 | 7,821,507 | 12/015,507 | | |

BACKGROUND OF THE INVENTION

Chemical dyes are important compounds for a range of applications. For example, inkjet inks typically comprise at least one colorant in the form of a dye. Many dyes are charged molecules carrying either a positive or negative charge, which is balanced with a counterion. The present invention specifically relates to cationic salts of sulfonated dyes, such as sulfonated phthalocyanine dyes.

Sulfonated phthalocyanine dyes are useful in inkjet ink applications. For example, sulfonated copper phthalocyanines are well-known cyan dyes. More recently, the present Applicant has shown that sulfonated gallium naphthlocyanines are useful IR dyes having minimal visibility and excellent ozonefastness. Accordingly, sulfonated gallium naphthlocyanines have found utility in the Applicant's Netpage and Hyperlabel™ systems.

The Netpage and Hyperlabel™ systems generally require a substrate having a position-coding pattern printed thereon. The coding pattern is preferably printed with an IR-absorbing ink having minimal visibility, so that it does not interfere with the visible content of the substrate. A user can interact with the substrate using an optical sensing device, which reads part of the coding pattern and generates interaction data. This interaction data is transmitted to a computer system, which uses the data to determine what action is being requested by the user. For example, a user may make handwritten input onto a form, click on a printed hyperlink, or request information relating to a product item. This input is interpreted by the computer system with reference to a page description corresponding to the printed substrate.

Position-coding patterns for Netpage and Hyperlabel™ may be printed by analogue (e.g. offset) or digital (e.g. inkjet) printers. If the position-coding pattern is printed using an inkjet printer, it is important that the printhead has excellent longevity. Preferably, an IR channel in the printhead, used for printing the coding pattern, should have at least as good longevity as other color channels used for printing graphics, text etc.

Kogation is a term used to describe a phenomenon whereby residues are deposited over time on a heater element in an inkjet printhead. Kogation typically occurs from repeated firing of a heater element and is generally understood to result from high-temperature deposition of ink component residues. Usually, the inkjet dye (or pigment) is responsible for kogation on inkjet heater elements.

Therefore, an important characteristic of inkjet inks in thermal inkjet printing is their propensity to kogate on a heater element. Ideally, an inkjet dye should exhibit minimal kogation, which consequently improves the lifetime of an inkjet printhead.

One approach to minimizing kogation is to add relatively large amounts of surfactant or other additives to the ink vehicle. For example, U.S. Pat. No. 6,533,851 describes phosphonate additives for inkjet inks, which are claimed to reduce kogation. However, additives of this type generally compromise print quality by increasing intercolor bleed.

Another approach to the problem of kogation is to simply ignore the kogate and 'overpower' the heater elements so that water is superheated through the kogate. This approach is unsatisfactory in the Applicant's Memjet® printheads, which use minimal ink ejection energy for each nozzle so as to achieve high-speed pagewidth printing. Overpowering each nozzle would inevitably compromise print speed and/or nozzle density.

It would therefore be desirable to provide an inkjet dye, which exhibits reduced kogation. It would be further desirable to provide an IR-absorbing inkjet dye, which exhibits reduced kogation.

SUMMARY OF THE INVENTION

In a first aspect, there is provided a salt of a sulfonated dye comprising at least one ammonium cation, wherein the or each ammonium cation comprises at least 3 hydroxyl groups. The ammonium cation is, of course, the counterion for the anionic sulfonate moiety in the salt.

Optionally, the ammonium cation comprises at least 4 hydroxyl groups.

Optionally, the ammonium cation comprises at least 5 hydroxyl groups.

Optionally, the ammonium cation is of formula (A):

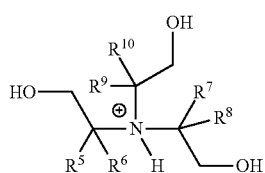
(A)

wherein:
$R^5$, $R^6$, $R^7$, $R^8$, $R^9$ and $R^{10}$ are each independently selected from the group comprising: H and —$CH_2OH$.

Optionally, the ammonium cation is selected from the group comprising: protonated triethanolamine; and protonated 2,2-bis(hydroxymethyl)-2,2',2"-nitrilotriethanol.

Optionally, the dye is a sulfonated phthalocyanine dye.

Optionally, the dye is an IR-absorbing dye.

Optionally, the salt is of formula (I):

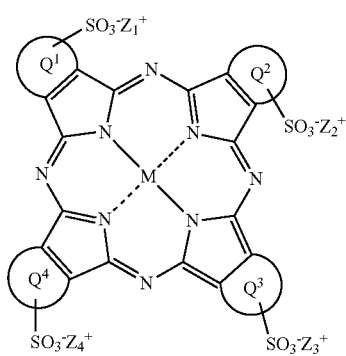
(I)

wherein:
$Q^1$, $Q^2$, $Q^3$ and $Q^4$ are the same or different and are independently selected from a $C_{3-20}$ arylene group or a $C_{3-20}$ heteroarylene group;

M is ($H_2$) or a metal selected from the group comprising: $Si(A^1)(A^2)$, $Ge(A^1)(A^2)$, $Ga(A^1)$, Mg, $Al(A^1)$, TiO, $Ti(A^1)(A^2)$, ZrO, $Zr(A^1)(A^2)$, VO, $V(A^1)(A^2)$, Mn, $Mn(A^1)$, Fe, $Fe(A^1)$, Co, Ni, Cu, Zn, Sn, $Sn(A^1)(A^2)$, Pb, $Pb(A^1)(A^2)$, Pd and Pt;

$A^1$ and $A^2$ are axial ligands, which may be the same or different, and are selected from the group comprising: —OH, halogen, —$OR^3$, —$OC(O)R^4$ and —$O(CH_2CH_2O)_eR^e$ wherein e is an integer from 2 to 10 and $R^e$ is H, $C_{1-8}$ alkyl or —$C(O)C_{1-8}$ alkyl;

$R^3$ is $C_{1-20}$ alkyl, $C_{5-12}$ aryl, $C_{5-20}$ arylalkyl or $Si(R^x)(R^y)(R^z)$;

$R^4$ is $C_{1-20}$ alkyl, $C_{5-12}$ aryl or $C_{5-20}$ arylalkyl;

$R^x$, $R^y$ and $R^z$ are the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy; and $Z_1^+$, $Z_2^+$, $Z_3^+$ and $Z_4^+$ are independently selected from the group comprising: H and an ammonium cation comprising at least 3 hydroxyl groups, wherein at least one of $Z_1^+$, $Z_2^+$, $Z_3^+$ and $Z_4^+$ is said ammonium cation.

Optionally, the salt is of formula (II):

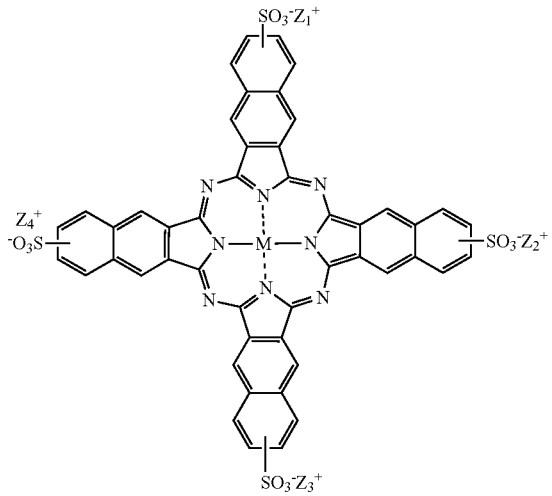
(II)

wherein
M is ($H_2$) or a metal selected from the group comprising: $Si(A^1)(A^2)$, $Ge(A^1)(A^2)$, $Ga(A^1)$, Mg, $Al(A^1)$, TiO, $Ti(A^1)(A^2)$, ZrO, $Zr(A^1)(A^2)$, VO, $V(A^1)(A^2)$, Mn, $Mn(A^1)$, Fe, $Fe(A^1)$, Co, Ni, Cu, Zn, Sn, $Sn(A^1)(A^2)$, Pb, $Pb(A^1)(A^2)$, Pd and Pt;

$A^1$ is an axial ligand selected from —OH, halogen, —$OR^3$, —$OC(O)R^4$ or —$O(CH_2CH_2O)_eR^e$ wherein e is an integer from 2 to 10 and Re is H, $C_{1-8}$ alkyl or $C(O)C_{1-8}$ alkyl;

$R^3$ is selected from $C_{1-12}$ alkyl, $C_{5-12}$ aryl, $C_{5-12}$ arylalkyl or $Si(R^x)(R^y)(R^z)$;

$R^4$ is selected from $C_{1-12}$ alkyl, $C_{5-12}$ aryl or $C_{5-12}$ arylalkyl;

$R^x$, $R^y$ and $R^z$ may be the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy; and $Z_1^+$, $Z_2^+$, $Z_3^+$ and $Z_4^+$ are independently selected from the group comprising: H and an ammonium cation comprising at least 3 hydroxyl groups, wherein at least one of $Z_1^+$, $Z_2^+$, $Z_3^+$ and $Z_4^+$ is said ammonium cation.

Optionally, at least three of $Z_1^+$, $Z_2^+$, $Z_3^+$ and $Z_4^+$ are said ammonium cation.

In a second aspect, there is provided an inkjet ink comprising a salt as described above.

In a third aspect, there is provided a method of reducing kogation in an inkjet printhead, the method comprising: printing from the printhead using an inkjet ink as described above.

Optionally, the printhead comprises a plurality of nozzles, each nozzle comprising: a nozzle chamber containing said ink; a heater element for heating said ink; and a nozzle opening for ejection of ink.

Optionally, the heater element is comprised of titanium nitride or a nitride of a titanium alloy.

Optionally, the heater element is comprised of titanium aluminium nitride.

Optionally, the heater element is a cantilever beam suspended across said nozzle chamber.

Optionally, the printing includes at least 50 million drop actuations.

In a fourth aspect, there is provided an inkjet printhead comprising a plurality of nozzles, each nozzle comprising: a nozzle chamber containing an inkjet ink as described above; a heater element for heating said ink; and a nozzle opening for ejection of ink.

Optionally, the heater element is comprised of titanium aluminium nitride.

In a fifth aspect, there is provided a substrate having a salt as described above disposed thereon or therein.

DETAILED DESCRIPTION

Sulfonated Dye Salts

Figure 1:
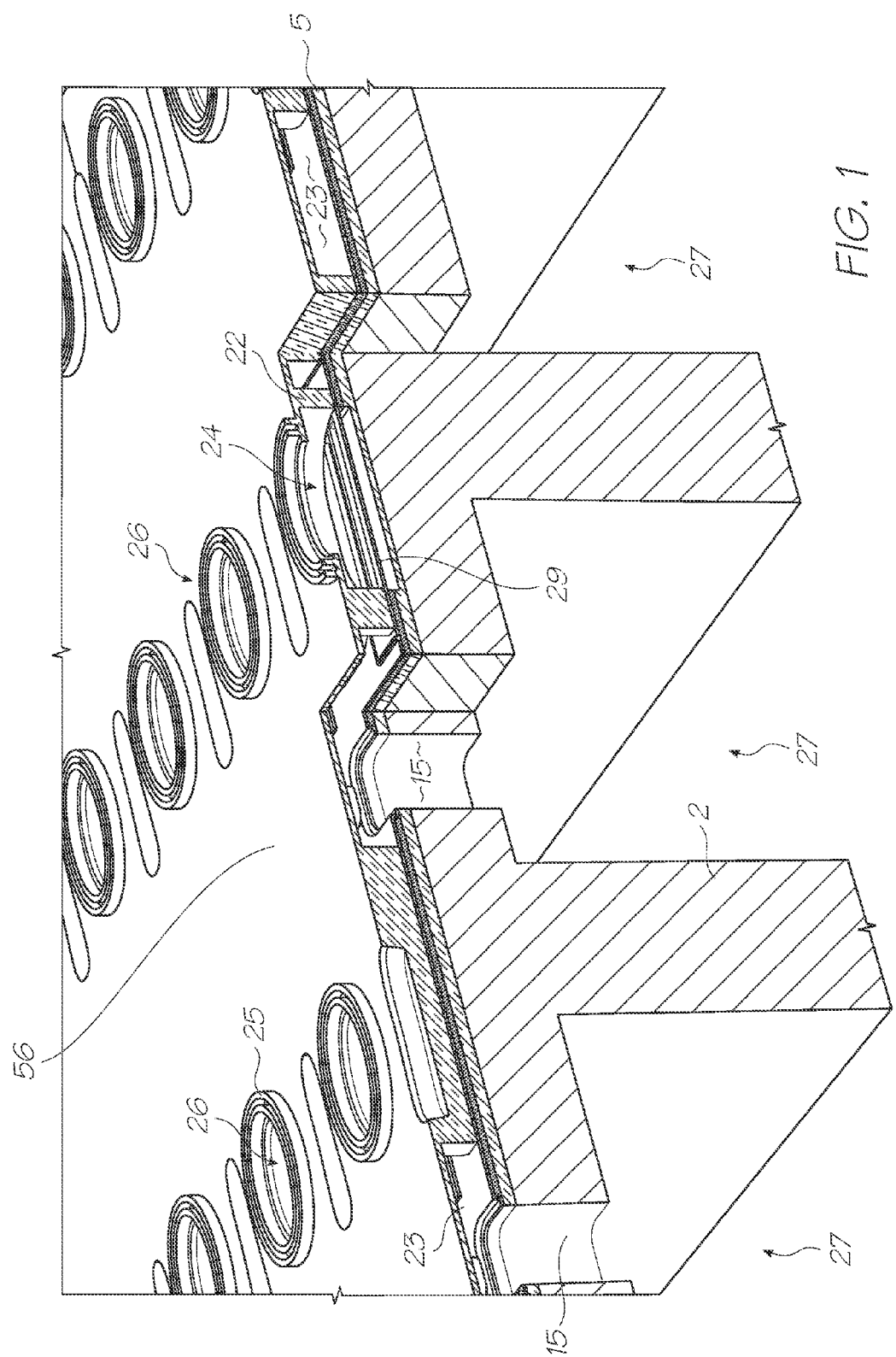
FIG. 1 is a partial perspective view of an array of nozzle assemblies of a thermal inkjet printhead.

As used herein, the term "sulfonated dye" refers to any dye molecule bearing a sulfonate group. Sulfonated dyes are a well-known class of compound. Examples of some commercially available sulfonated dyes are Food Black 1 (Brilliant Black BN), Food Black 2 (Black 7984), Allura Red AC, Amaranth, Amido Black, Food Red 3 (Azorubine), Food Brown 3 (Brown HT), Chrysoine resorcinol (Resorcinol Yellow), Congo Red, Food Yellow 2 (Fast Yellow), Hydroxynaphthol Blue, Lithol Rubine BK, Pigment Rubine, Orange B, Orange G, Orange GGN, Food Red 7, Acid Red 1 (Red 2G), Food Red 2, Orange Yellow S, Sunset Yellow, tartrazine, Yellow 2G, Food Blue 2, Food Green S, Food Green 2, Food Blue 5, and sulfonated phthalocyanines (e.g. copper phthalocyanine, Aldrich Catalogue No. 41,205-8). The Applicant has previously described sulfonated phthalocyanine IR dyes, such as sulfonated naphthalocyanines (see U.S. Pat. Nos. 7,148,345 and 7,122,076).

As used herein, the term "phthalocyanine" refers to any compound belonging to the general class of macrocyclic phthalocyanines, and includes naphthalocyanines, quinolinephthalocyanines etc, as well as substituted derivatives thereof.

As used herein, the term "IR-absorbing dye" means a substance, which absorbs infrared radiation and which is therefore suitable for detection by an infrared sensor. Preferably, the IR-absorbing dye absorbs in the near infrared region, and preferably has a $\square_{max}$ in the range of 700 to 1000 nm, more preferably 750 to 900 nm, more preferably 780 to 850 nm. Dyes having a $\square_{max}$ in this range are particularly suitable for detection by semiconductor lasers, such as a gallium aluminium arsenide diode laser.

Typically in the prior art, sulfonated dyes are provided in their salt form. The usual salts of sulfonated dyes are sodium salts, lithium salts, potassium salts and calcium salts. Such salts are inexpensive, readily soluble in aqueous-based media and easy to prepare. However, these salts suffer from severe kogation, particularly salts of sulfonated phthalocyanines used in the Applicant's Memjet® printers.

By contrast, the ammonium salts according to the present invention, where the ammonium cation comprises at least 3 hydroxyl groups, exhibit reduced kogation compared to, for example, sodium salts.

Preferably, the ammonium cation comprises at least 5 hydroxyl groups. An example of such a cation is protonated "bis-tris" (protonated 2,2-bis(hydroxymethyl)-2,2',2"-nitrilotriethanol), which exhibits vastly reduced kogation compared to sodium salts. "Bis-tris", which comprises 5 hydroxyl groups, also exhibits reduced kogation compared to, for example, triethanolamine which comprises 3 hydroxyl groups.

In the most general form of the present invention, the dye may be any sulfonated dye, such as those commonly used in printing inks. These include Food dyes, sulfonated phthalocyanines, sulfonated azo dyes and the like.

The present invention has been shown to work particularly well with sulfonated phthalocyanines, which include sulfonated naphthalocyanines. Sulfonated phthalocyanine dyes may be metal-free or may comprise a central metal atom moiety M. Optionally, M is selected from $Si(A^1)(A^2)$, $Ge(A^1)(A^2)$, $Ga(A^1)$, $Mg$, $Al(A^1)$, $TiO$, $Ti(A^1)(A^2)$, $ZrO$, $Zr(A^1)(A^2)$, $VO$, $V(A^1)(A^2)$, $Mn$, $Mn(A^1)$, $Fe$, $Fe(A^1)$, $Co$, $Ni$, $Cu$, $Zn$, $Sn$, $Sn(A^1)(A^2)$, $Pb$, $Pb(A^1)(A^2)$, $Pd$ and $Pt$. Phthalocyanines having a range of central metal atom moieties are well known in the literature (see, for example, Aldrich Catalogue). Copper phthalocyanine tetrasulfonate is a particularly well known example, used in cyan inkjet dyes. Sulfonation of phthalocyanines is readily achievable using standard sulfonation chemistry.

Optionally, M is selected from $Si(A^1)(A^2)$, $Ge(A^1)(A^2)$, $Ga(A^1)$, $Al(A^1)$, $VO$, $Mn$, $Mn(A^1)$, $Cu$, $Zn$, $Sn$, and $Sn(A^1)(A^2)$. S Optionally, M is $Ga(A^1)$.

$A^1$ and $A^2$ are axial ligands, which may be the same or different. Optionally, $A^1$ and $A^2$ and are selected from —OH, halogen or —$OR^3$. Optionally, $A^1$ and $A^2$ may be —$OC(O)R^4$ or —$O(CH_2CH_2O)_eR^e$ wherein e is an integer from 2 to 10 and $R^e$ is H, $C_{1-8}$ alkyl or —$C(O)C_{1-8}$ alkyl. Typically $A^1$ is a hydroxyl group (—OH).

$R^3$ may be $C_{1-20}$ alkyl, $C_{5-12}$ aryl, $C_{5-20}$ arylalkyl or $Si(R^x)(R^y)(R^z)$.

$R^4$ may be $C_{1-20}$ alkyl, $C_{5-12}$ aryl or $C_{5-20}$ arylalkyl.

$R^x$, $R^y$ and $R^z$ may be the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy.

An example of a sulfonated phthalocyanine dye salt, which may be used in the present invention is shown in formula (I):

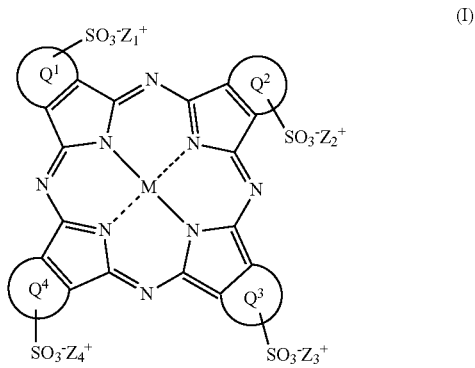

wherein:

$Q^1$, $Q^2$, $Q^3$ and $Q^4$ are the same or different and are independently selected from a $C_{3-20}$ arylene group or a $C_{3-20}$ heteroarylene group (e.g. $C_4$ arylene to provide typical phthalocyanines or $C_8$ arylene to provide naphthalocyanines);

M is $(H_2)$ or a metal selected from the group comprising: $Si(A^1)(A^2)$, $Ge(A^1)(A^2)$, $Ga(A^1)$, $Mg$, $Al(A^1)$, $TiO$, $Ti(A^1)(A^2)$, $ZrO$, $Zr(A^1)(A^2)$, $VO$, $V(A^1)(A^2)$, $Mn$, $Mn(A^1)$, $Fe$, $Fe(A^1)$, $Co$, $Ni$, $Cu$, $Zn$, $Sn$, $Sn(A^1)(A^2)$, $Pb$, $Pb(A^1)(A^2)$, $Pd$ and $Pt$;

$A^1$ and $A^2$ are axial ligands, which may be the same or different, and are selected from the group comprising: —OH, halogen, —OR³, —OC(O)R⁴ and —O(CH₂CH₂O)$_e$R$^e$ wherein e is an integer from 2 to 10 and R$^e$ is H, $C_{1-8}$ alkyl or —C(O)$C_{1-8}$ alkyl;

R³ is $C_{1-20}$ alkyl, $C_{5-12}$ aryl, $C_{5-20}$ arylalkyl or Si(R$^x$)(R$^y$)(R$^z$);

R⁴ is $C_{1-20}$ alkyl, $C_{5-12}$ aryl or $C_{5-20}$ arylalkyl;

R$^x$, R$^y$ and R$^z$ are the same or different and are selected from $C_{1-12}$ alkyl, $C_{5-12}$ aryl, $C_{5-12}$ arylalkyl $C_{1-12}$ alkoxy, $C_{5-12}$ aryloxy or $C_{5-12}$ arylalkoxy; and $Z_1^+$, $Z_2^+$, $Z_3^+$ and $Z_4^+$ are independently selected from the group comprising: H and an ammonium cation comprising at least 3 hydroxyl groups, wherein at least one of $Z_1^+$, $Z_2^+$, $Z_3^+$ and $Z_4^+$ is said ammonium cation.

Usually, either three of $Z_1^+$, $Z_2^+$, $Z_3^+$ and $Z_4^+$ or all of $Z_1^+$, $Z_2^+$, $Z_3^+$ and $Z_4^+$ are the ammonium cation, depending on the exact nature of the cation and the method of salt precipitation used in the preparation.

Optionally, Q¹, Q², Q³ and Q⁴ are the same and are each a $C_{4-10}$ arylene group (e.g. phthalocyanines and naphthalocyanines). Q¹, Q², Q³ and Q⁴ may, of course, be substituted in accordance with the optional aryl substituents described below.

The general synthesis of phthalocyanines in accordance with formula (I) are described in, for example, the Applicant's earlier U.S. Pat. Nos. 7,148,345 and 7,122,076, the contents of which are herein incorporated by reference. Specific salt syntheses are described hereinbelow.

Optionally, the groups represented as Q¹, Q², Q³ and Q⁴ are each selected from an arylene group of formula (i) or (ii) below:

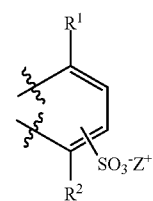

(i)

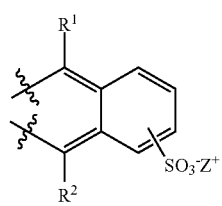

(ii)

wherein:

R¹ and R² may be the same or different and are selected from hydrogen, hydroxyl, $C_{1-12}$ alkyl, $C_{1-12}$ alkoxy, amino, $C_{1-12}$ alkylamino, di($C_{1-12}$ alkyl)amino, halogen, cyano, thiol, $C_{1-12}$ alkylthio, $C_{5-12}$ arylthio, nitro, carboxy, $C_{1-12}$ alkylcarbonyl, $C_{1-12}$ alkoxycarbonyl, $C_{1-12}$ alkylcarbonyloxy or $C_{1-12}$ alkylcarbonylamino; and $Z^+$=$Z_1^+$, $Z_2^+$, $Z_3^+$ or $Z_4^+$.

A more specific example of a sulfonated dye salt, which may be used in the present invention is the sulfonated naphthalocyanine salt shown in formula (II):

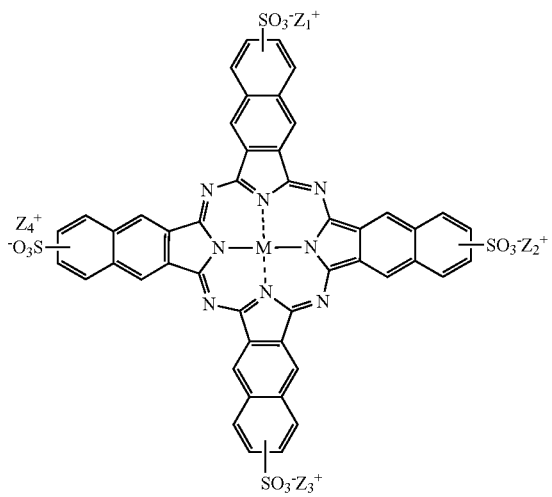

(II)

wherein

M is (H₂) or a metal selected from the group comprising: Si(A¹)(A²), Ge(A¹)(A²), Ga(A¹), Mg, Al(A¹), TiO, Ti(A¹)(A²), ZrO, Zr(A¹)(A²), VO, V(A¹)(A²), Mn, Mn(A¹), Fe, Fe(A¹), Co, Ni, Cu, Zn Sn, Sn(A¹)(A²), Pb, Pb(A¹)(A²), Pd and Pt;

A¹ is an axial ligand selected from —OH, halogen, —OR³, —OC(O)R⁴ or —O(CH₂CH₂O)$_e$R$^e$ wherein e is an integer from 2 to 10 and Re is H, $C_{1-8}$ alkyl or C(O)$C_{1-8}$ alkyl;

R³ is selected from $C_{1-12}$ alkyl, $C_{5-12}$ aryl, $C_{5-12}$ arylalkyl or Si(R$^x$)(R$^y$)(R$^z$);

R⁴ is selected from $C_{1-12}$ alkyl, $C_{5-12}$ aryl or $C_{5-12}$ arylalkyl;

R$^x$, R$^y$ and R$^z$ may be the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy; and $Z_1^+$, $Z_2^+$, $Z_3^+$ and $Z_4^+$ are independently selected from the group comprising: H and an ammonium cation comprising at least 3 hydroxyl groups, wherein at least one of $Z_1^+$, $Z_2^+$, $Z_3^+$ and $Z_4^+$ is said ammonium cation.

Typically, $Z_1^+$=H; and $Z_2^+$=$Z_3^+$=$Z_4^+$=the ammonium cation comprising at least 3 hydroxyl groups.

Alternatively, $Z_1^+$=$Z_2^+$=$Z_3^+$=$Z_4^+$=the ammonium cation comprising at least 3 hydroxyl groups. Optionally, M is Ga(OH).

The term "aryl" is used herein to refer to an aromatic group, such as phenyl, naphthyl or triptycenyl. $C_{6-12}$ aryl, for example, refers to an aromatic group having from 6 to 12 carbon atoms, excluding any substituents. The term "arylene", of course, refers to divalent groups corresponding to the monovalent aryl groups described above. Any reference to aryl implicitly includes arylene, where appropriate.

The term "heteroaryl" refers to an aryl group, where 1, 2, 3 or 4 carbon atoms are replaced by a heteroatom selected from N, O or S. Examples of heteroaryl (or heteroaromatic) groups include pyridyl, benzimidazolyl, indazolyl, quinolinyl, isoquinolinyl, indolinyl, isoindolinyl, indolyl, isoindolyl, pyrrolyl, imidazolyl, oxazolyl, isoxazolyl, pyrazolyl, isoxazolonyl, piperazinyl, pyrimidinyl, pyridyl, pyrimidinyl, benzopyrimidinyl, benzotriazole, quinoxalinyl, pyridazyl etc. The term "heteroarylene", of course, refers to divalent groups corresponding to the monovalent heteroaryl groups described above. Any reference to heteroaryl implicitly includes heteroarylene, where appropriate.

Unless specifically stated otherwise, aryl and heteroaryl groups may be optionally substituted with 1, 2, 3, 4 or 5 of the substituents described below. The optional substituent(s) are independently selected from $C_{1-8}$ alkyl, $C_{1-8}$ alkoxy, —$(OCH_2CH_2)_dOR^d$ (wherein d is an integer from 2 to 5000 and $R^d$ is H, $C_{1-8}$ alkyl or $C(O)C_{1-8}$ alkyl), cyano, halogen, amino, hydroxyl, thiol, —$SR^v$, —$NR^uR^v$, nitro, phenyl, phenoxy, —$CO_2R^v$, —$C(O)R^v$, —$OCOR^v$, —$SO_2R^v$, —$SO_2R^v$, —$SO_2OR^v$, —$NHC(O)R^v$, —$CONr^uR^v$, —$CONR^uR^v$, —$SO_2NR^uR^v$, wherein $R^u$ and $R^v$ are independently selected from hydrogen, $C_{1-12}$ alkyl, phenyl or phenyl-$C_{1-8}$ alkyl (e.g. benzyl). Where, for example, a group contains more than one substituent, different substituents can have different $R^u$ or $R^v$ groups. For example, a naphthyl group may be substituted with three substituents: —$SO_2NHPh$, —$CO_2Me$ group and —$NH_2$.

The term "alkyl" is used herein to refer to alkyl groups in both straight and branched forms. Unless stated otherwise, the alkyl group may be interrupted with 1, 2, 3 or 4 heteroatoms selected from O, NH or S. Unless stated otherwise, the alkyl group may also be interrupted with 1, 2 or 3 double and/or triple bonds. However, the term "alkyl" usually refers to alkyl groups having double or triple bond interruptions. Where "alkenyl" groups are specifically mentioned, this is not intended to be construed as a limitation on the definition of "alkyl" above.

Where reference is made to, for example, $C_{1-20}$ alkyl, it is meant the alkyl group may contain any number of carbon atoms between 1 and 20. Unless specifically stated otherwise, any reference to "alkyl" means $C_{1-20}$ alkyl, preferably $C_{1-12}$ alkyl or $C_{1-6}$ alkyl.

The term "alkyl" also includes cycloalkyl groups. As used herein, the term "cycloalkyl" includes cycloalkyl, polycycloalkyl, and cycloalkenyl groups, as well as combinations of these with linear alkyl groups, such as cycloalkylalkyl groups. The cycloalkyl group may be interrupted with 1, 2 or 3 heteroatoms selected from O, N or S and may be specifically indicated as a heterocycloalkyl group. Examples of heterocycloalkyl groups are pyrrolidino, morpholino, piperidino etc. However, the term "cycloalkyl" usually refers to cycloalkyl groups having no heteroatom interruptions. Examples of cycloalkyl groups include cyclopentyl, cyclohexyl, cyclohexenyl, cyclohexylmethyl and adamantyl groups.

The term "arylalkyl" refers to groups such as benzyl, phenylethyl and naphthylmethyl.

The term "halogen" or "halo" is used herein to refer to any of fluorine, chlorine, bromine and iodine. Usually, however, halogen refers to chlorine or fluorine substituents.

Any chiral compounds described herein have not been given stereo-descriptors. However, when compounds may exist in stereoisomeric forms, then all possible stereoisomers and mixtures thereof are included (e.g. enantiomers, diastereomers and all combinations including racemic mixtures etc.).

Likewise, when compounds may exist in a number of regioisomeric forms, then all possible regioisomers and mixtures thereof are included.

For the avoidance of doubt, the term "a" (or "an"), in phrases such as "comprising a", means "at least one" and not "one and only one". Where the term "at least one" is specifically used, this should not be construed as having a limitation on the definition of "a".

Throughout the specification, the term "comprising", or variations such as "comprise" or "comprises", should be construed as including a stated element, integer or step, but not excluding any other element, integer or step.

Inks

The dye salts described above may be formulated in inkjet inks. Preferably, the inkjet ink is a water-based inkjet ink.

Water-based inkjet ink compositions are well known in the literature and, in addition to water, may comprise additives, such as co-solvents, biocides, sequestering agents, humectants, viscosity modifiers, penetrants, wetting agents, surfactants etc.

Co-solvents are typically water-soluble organic solvents. Suitable water-soluble organic solvents include $C_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents include polar solvents, such as 2-pyrrolidone, N-methylpyrrolidone, -caprolactam, dimethyl sulfoxide, sulfolane, morpholine, N-ethylmorpholine, 1,3-dimethyl-2-imidazolidinone and combinations thereof.

The inkjet ink may contain a high-boiling water-soluble organic solvent which can serve as a wetting agent or humectant for imparting water retentivity and wetting properties to the ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, erythritol, pentaerythritol and combinations thereof.

The total water-soluble organic solvent content in the inkjet ink is preferably about 5 to 50% by weight, more preferably 10 to 30% by weight, based on the total ink composition.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol or urea may also be used as penetrants.

The amount of penetrant is preferably in the range of 1 to 20% by weight, more preferably 1 to 10% by weight, based on the total ink composition.

The inkjet ink may also contain a surface active agent, especially an anionic surface active agent and/or a nonionic surface active agent. Useful anionic surface active agents include sulfonic acid types, such as alkanesulfonic acid salts, -olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Suitable nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesqui-oleate, polyoxyethylene mono-oleate, and polyoxyethylene stearate. Acetylene glycol surface active agents, such as 2,4,7,9-tetramethyl-5-decyne-4,7-diol, 3,6-dimethyl-4-octyne-3,6-diol or 3,5-dimethyl-1-hexyn-3-ol, may also be used.

The inkjet ink may also include a biocide, such as benzoic acid, dichlorophene, hexachlorophene, sorbic acid, hydroxybenzoic esters, sodium dehydroacetate, 1,2-benthiazolin-3-one, 3,4-isothiazolin-3-one or 4,4-dimethyloxazolidine.

The inkjet ink may also contain a sequestering agent, such as ethylenediaminetetraacetic acid (EDTA).

The inkjet ink may also contain a singlet oxygen quencher. The presence of singlet oxygen quencher(s) in the ink reduces the propensity for the IR-absorbing dye to degrade. The quencher consumes any singlet oxygen generated in the vicinity of the dye molecules and, hence, minimizes their degradation. An excess of singlet oxygen quencher is advantageous for minimizing degradation of the dye and retaining its IR-absorbing properties over time. Preferably, the singlet oxygen quencher is selected from ascorbic acid, 1,4-diazabicyclo-[2.2.2]octane (DABCO), azides (e.g. sodium azide), histidine or tryptophan.

Substrates

As mentioned above, the dyes of the present invention are especially suitable for use in Hyperlabel™ and Netpage systems. Such systems are described in more detail below and in the patent applications listed above, all of which are incorporated herein by reference in their entirety.

In the case of Hyperlabel™ and Netpage application, the IR dye is disposed on a substrate in the form of a coding pattern readable by an optically imaging sensing device. An example of a suitable coding pattern is described in U.S. Pat. No. 6,832,717, the contents of which is herein incorporated by reference. Typically, the coding pattern is disposed over a substantial portion of an interface surface of the substrate (e.g. greater than 20%, greater than 50% or greater than 90% of the surface).

Preferably, the substrate is IR reflective so that the dye disposed thereon may be read by a sensing device. The substrate may be comprised of any suitable material such as plastics (e.g. polyolefins, polyesters, polyamides etc.), paper, metal or combinations thereof. The substrate may be laminated.

For netpage applications, the substrate is preferably a paper sheet. For Hyperlabel™ applications, the substrate is preferably a tag, a label, a packaging material or a surface of a product item. Typically, tags and labels are comprised of plastics, paper or combinations thereof.

Thermal Bubble-Forming Inkjet Printhead

As mentioned above, the dyes of the present invention are especially suitable for use in the Applicant's thermal inkjet ("Memjet®") printheads. A brief description of a thermal inkjet printhead now follows. Further details of such printheads may be found in the cross-referenced patents and patent applications listed above, which are incorporated herein by reference.

Figure 2:
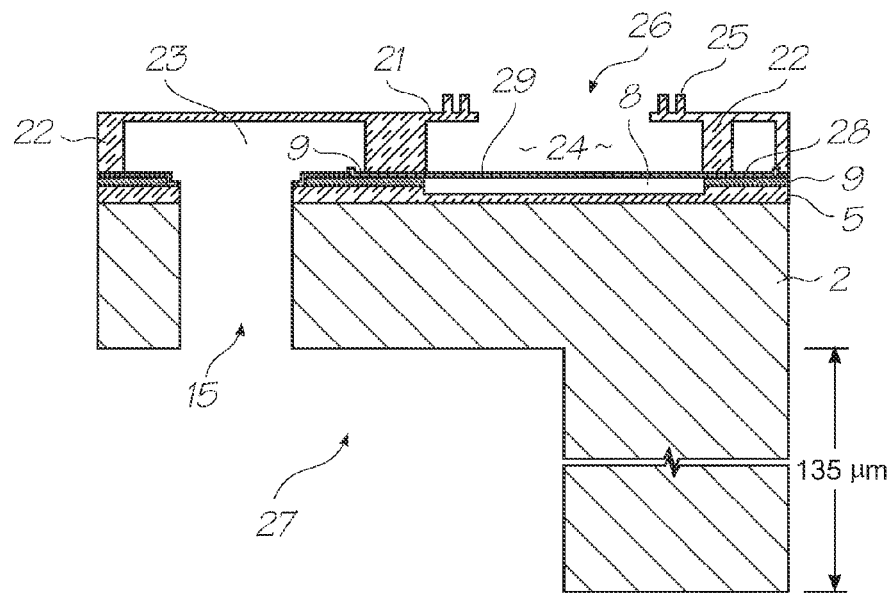
FIG. 2 is a side view of a nozzle assembly unit cell shown in FIG. 1.
Figure 3:
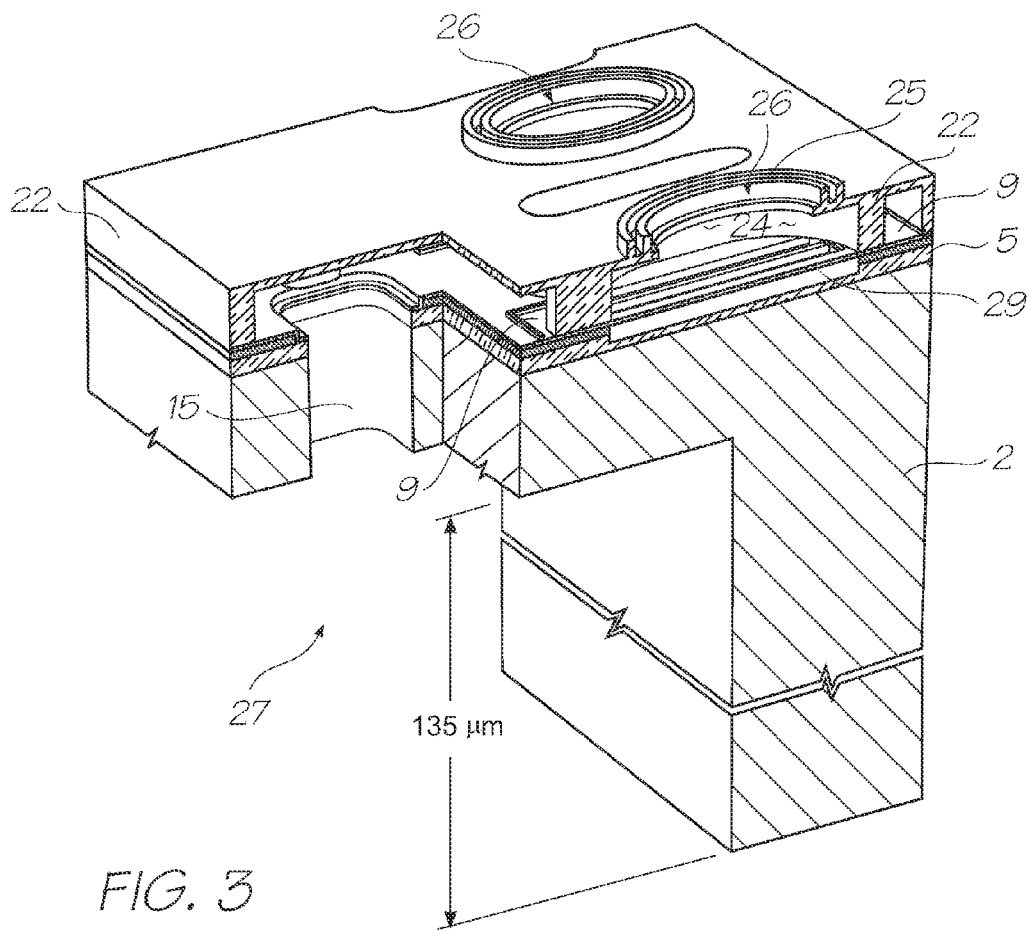
FIG. 3 is a perspective of the nozzle assembly shown in FIG. 2.

Referring to FIG. 1, there is shown a part of printhead comprising a plurality of nozzle assemblies. FIGS. 2 and 3 show one of these nozzle assemblies in side-section and cut-away perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication.

Typically, the nozzle plate 56 and sidewalls 21 are formed of a ceramic material, such as silicon dioxide or silicon nitride. These hard materials have excellent properties for printhead robustness, and their inherently hydrophilic nature is advantageous for supplying ink to the nozzle chambers 24 by capillary action.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8.

Typically, the heater element 29 is comprised of a titanium nitride or a nitride of a titanium alloy. An example of titanium alloy nitride is titanium aluminium nitride. However, it will be appreciated that other materials may be used as the heater element 29, and the present invention is not restricted to those materials specifically recited herein.

Current is supplied to the heater element 29 via electrodes 9 connected to drive circuitry in underlying CMOS layers of the substrate 2. When a current is passed through the heater element 29, it rapidly superheats surrounding ink to form a gas bubble, which forces ink through the nozzle opening. By suspending the heater element 29, it is completely immersed in ink when the nozzle chamber 24 is primed. This improves printhead efficiency, because less heat dissipates into the underlying substrate 2 and more input energy is used to generate a bubble.

The heater element 29 shows less kogation using inks in accordance with the present invention, when compared with inks comprising, for example, sodium salts of sulfonated dyes. Less kogation is observed after about 20 million drop ejections, about 30 million drop ejections, about 40 million drop ejections or about 50 million drop ejections.

Consequently, the lifetime of the printhead is increased by at least 2-fold, at least 3-fold, at least 4-fold or at least 5-fold when compared with inks comprising sodium salts of sulfonated dyes.

As seen most clearly in FIG. 1, the nozzles are arranged in rows and an ink supply channel 27, extending longitudinally along the row, supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

A MEMS fabrication process for manufacturing such printheads was described in detail in U.S. application Ser. No. 11/246,684 filed on Oct. 11, 2005, the contents of which is herein incorporated by reference.

The invention will now be described with reference to the following examples. However, it will of course be appreciated that this invention may be embodied in many other forms without departing from the scope of the invention, as defined in the accompanying claims.

EXAMPLES

In our earlier U.S. Pat. No. 7,148,345 and U.S. Patent Application No. 60/851,754, the contents of which are herein incorporated by reference, we described the preparation of various salts of gallium naphthalocyanine tetrasulfonic acid 1. The skilled person will readily appreciate that salts according to the present invention may be readily prepared from corresponding sulfonic acids by conventional methods.

In testing a range of alternative salts, including those of the alkali metals it was unexpectedly found that when the salt of acid 1 comprises protonated "bis-tris" [2,2-bis(hydroxymethyl)-2,2',2"-nitrilotriethanol] 2 as the counterion, kogation on TiAlN heaters is greatly reduced and the effective lifetime of a thermal inkjet printhead is increased by at least 3-5-fold.

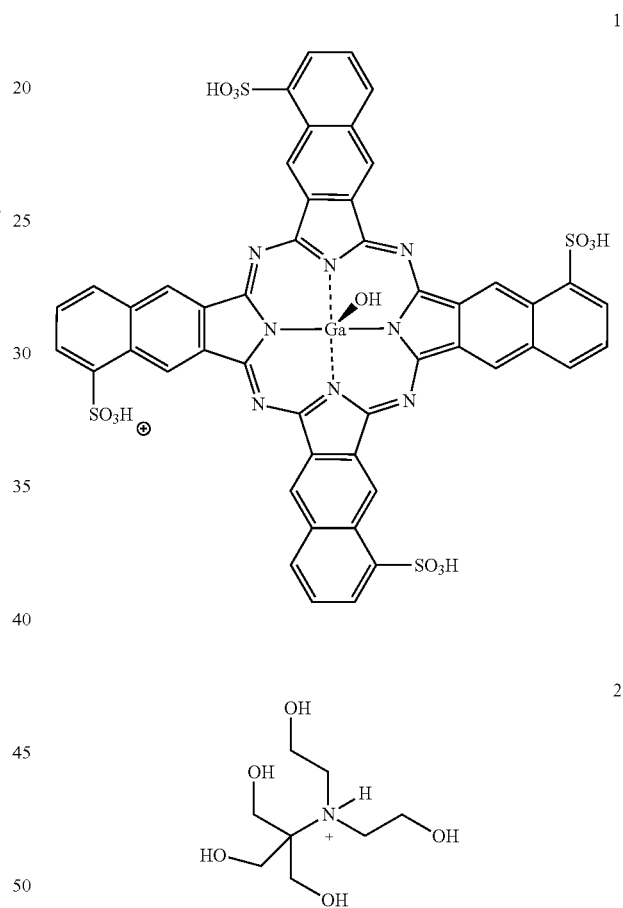

A further advantage of the protonated bis-tris counterion is that it greatly facilitates the preparation and isolation of the corresponding salt of the acid 1. In general, salts of acid 1 are conveniently prepared by mixing an amine or metal hydroxide with the acid in methanol/water (ca. 80:20), diluting with a fixed amount of ethyl acetate and filtering the product. Most of the salts, especially the alkali metal salts, precipitate as fine solids that are slow to filter, clogging membranes easily. However, in the case of bis-tris salts, these have a lower solubility in the reaction medium and flocculate readily to afford a much coarser precipitate that filters easily. This lower solubility causes the product to precipitate and stop at the tris(bis-tris) inner salt (3) stage rather than proceed on to the tetrakis(bis-tris) salt (4) form.

3
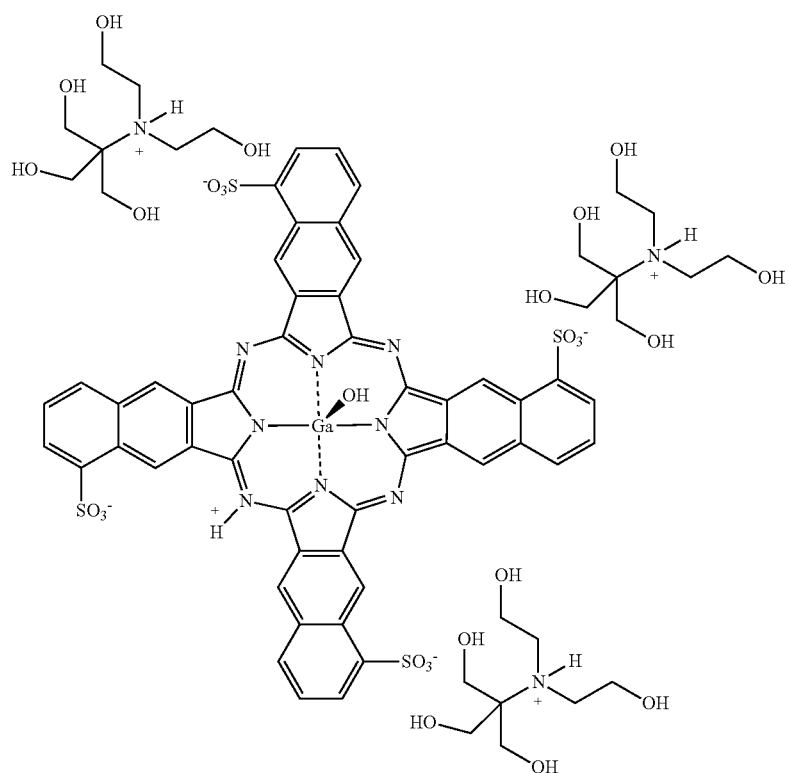
4
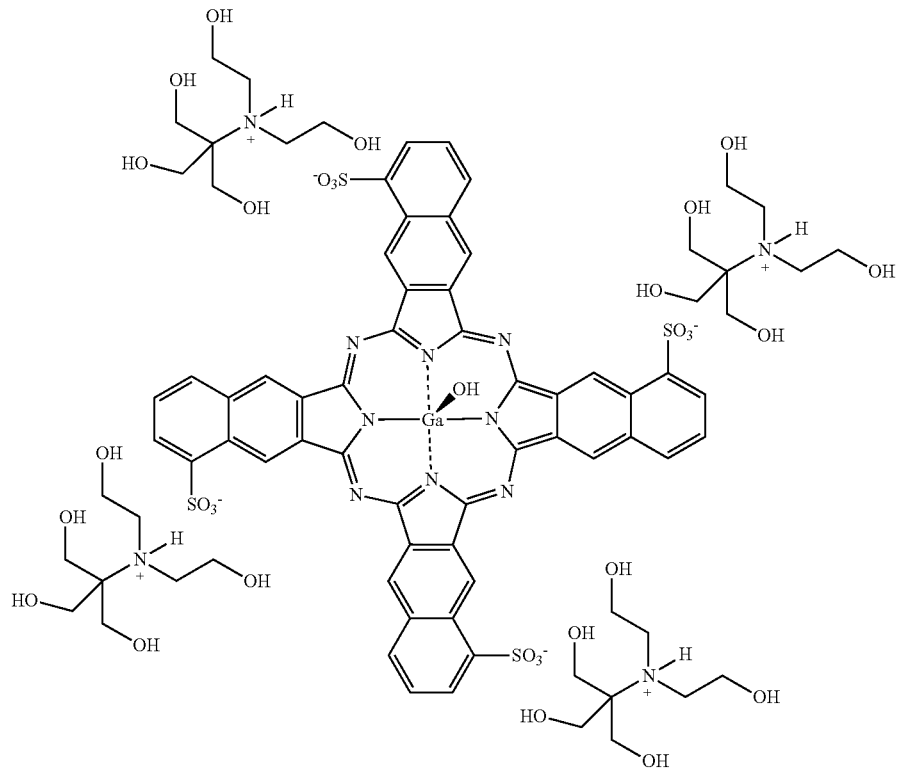

Example 1

Preparation of the Bis-Tris Salt (3)

Bis-tris 2 (26.3 g; 0.125 mol, 7 equiv.) was dissolved completely in methanol (150 mL) and water (40 mL) and then gallium naphthalocyanine tetrasulfonic acid 1 (20.1 g; 0.018 mol) was added with stirring to give a green suspension. The reaction mixture was allowed to stir for 20 h and then ethyl acetate (350 mL) was added. After stirring for another 10 min. the reaction mixture was poured into ethyl acetate (250 mL) in a 2 L conical flask with vigorous stirring. The precipitated salt was filtered off on a sintered glass funnel under gravity, the filtrate draining readily at a fast rate. The moist solid was then washed with methanol (4×50 mL) under gravity and then the last traces were removed by suction. The resulting solid was air-dried before being dried under high vacuum at 65° C. The bis-tris salt was obtained as a green powder (23.7 g; 76%).

Example 2

Formulation of IR Inks

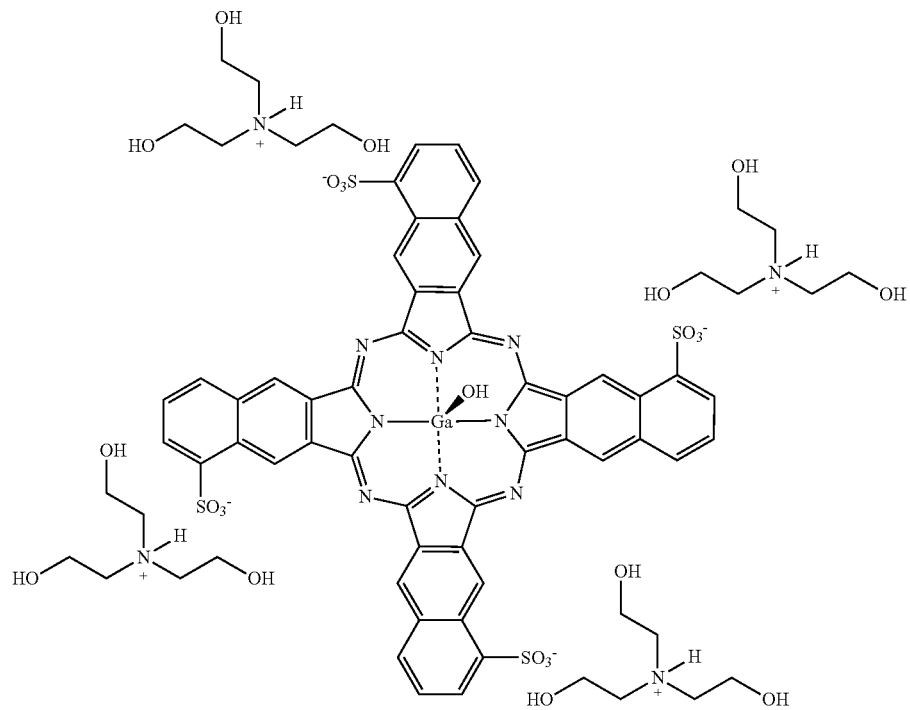

5

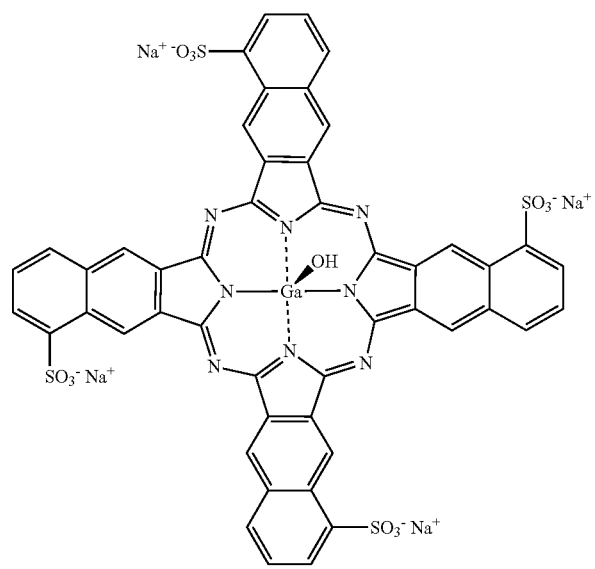

6

Dye salts 5 and 6 were prepared similarly to salt 3 prepared in Example 1.

Each IR dye salt (3, 5, 6) was formulated according to the components listed in Table 1 and filtered through a 0.2 μm PTFE filter membrane.

TABLE 1

Composition of an ink vehicle used for making up IR inks containing IR dye at 4 mM

| Ink component | % w/w |
|---|---|
| ethylene glycol | 5-15 |
| 1-propanol | 5-15 |
| 2-pyrrolidinone | 5-15 |
| biocide | 0.2 |
| water | balance |

Example 3

Kogation Testing

Each IR ink containing the respective dye salt (3, 5 or 6) was printed using the thermal inkjet printhead described in connection with FIGS. 1-3. The heater elements 29 were observed under high magnification after 50 million actuations.

The ink containing the sodium salt 6 performed the worst and a high degree of kogation was observed after 50 million actuations. The ink containing the triethanolamine salt 5 performed better than the sodium salt 6, although a moderate amount of kogation was still observed after 50 million actuations. However, the ink containing the "bis-tris" salt 3 performed excellently with minimal or no kogation observed after 50 million actuations.

It will be appreciated by ordinary workers in this field that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A sulfonated dye salt of formula (II):

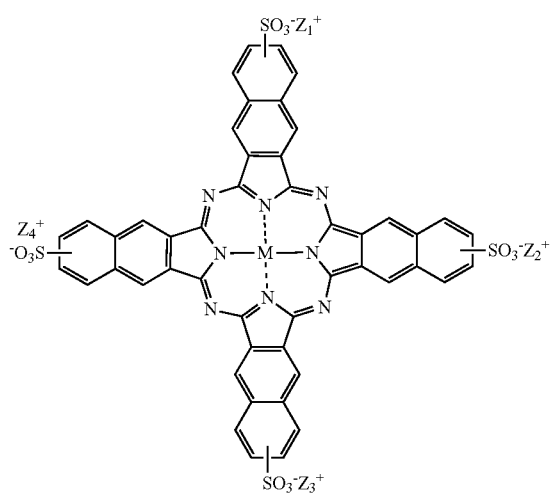

(II)

wherein
M is Ga($A^1$);
$A^1$ is an axial ligand selected from the group consisting of: —OH and halogen; and
$Z_1^+, Z_2^+, Z_3^+$ and $Z_4^+$ are independently selected from the group consisting of: H and an ammonium cation comprising at least 4 hydroxyl groups, wherein at least one of $Z_1^+, Z_2^+, Z_3^+$ and $Z_4^+$ is said ammonium cation.

2. The salt of claim 1, wherein said ammonium cation comprises at least 5 hydroxyl groups.

3. The salt of claim 1, wherein said ammonium cation is of formula (A):

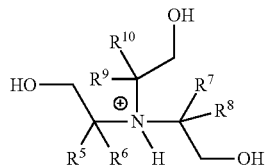

(A)

wherein:
$R^5, R^6, R^7, R^8, R^9$ and $R^{10}$ are each independently selected from the group consisting of: H and —CH$_2$OH.

4. The salt of claim 1, wherein said ammonium cation is protonated 2,2-bis(hydroxymethyl)-2,2',2''-nitrilotriethanol.

5. The salt of claim 1, wherein at least three of $Z_1^+, Z_2^+, Z_3^+$ and $Z_4^+$ are said ammonium cation.

6. The salt of claim 1, wherein each of $Z_1^+, Z_2^+, Z_3^+$ and $Z_4^+$ is said ammonium cation.

7. An inkjet ink comprising a salt according to claim 1.

8. A method of reducing kogation in an inkjet printhead having a plurality of nozzles, each nozzle comprising: a nozzle chamber containing said ink; a heater element for heating said ink; and a nozzle opening for ejection of said ink, said method comprising:
printing from the printhead utilizing an inkjet ink comprising a sulfonated dye salt of formula (II):

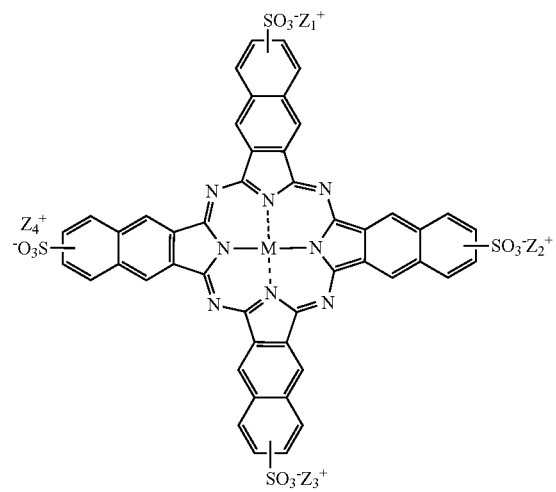

(II)

wherein
M is Ga($A^1$);
$A^1$ is an axial ligand selected from the group consisting of: —OH and halogen; and
$Z_1^+, Z_2^+, Z_3^+$ and $Z_4^+$ are independently selected from the group consisting of: H and an ammonium cation comprising at least 4 hydroxyl groups, wherein at least one of $Z_1^+, Z_2^+, Z_3^+$ and $Z_4^+$ is said ammonium cation,
wherein said heater element is comprised of titanium nitride or a nitride of a titanium alloy.

9. The method of claim 8, wherein said heater element is comprised of titanium aluminium nitride.

10. The method of claim 8, wherein said heater element is a cantilever beam suspended across said nozzle chamber.

11. The method of claim 8, wherein said printing includes at least 50 million drop actuations.

12. An inkjet printhead comprising a plurality of nozzles, each nozzle comprising: a nozzle chamber containing an inkjet ink; a heater element for heating said ink; and a nozzle opening for ejection of ink, wherein said heater element is comprised of titanium nitride or a nitride of a titanium alloy, and wherein said ink comprises a sulfonated dye salt of formula (II):

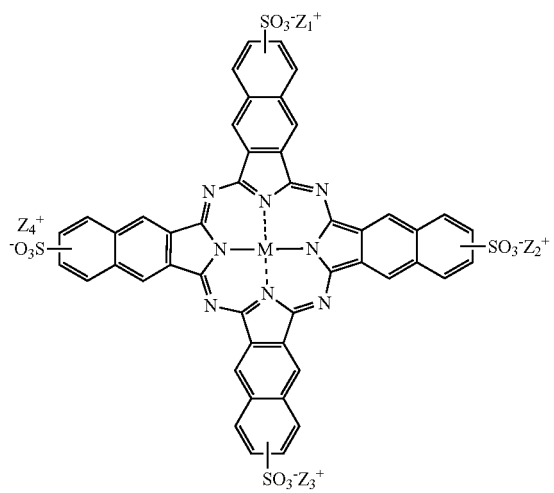

wherein

M is $Ga(A^1)$;

$A^1$ is an axial ligand selected from the group consisting of: —OH and halogen; and $Z_1^+$, $Z_2^+$, $Z_3^+$ and $Z_4^+$ are independently selected from the group consisting of: H and an ammonium cation comprising at least 4 hydroxyl groups, wherein at least one of $Z_1^+$, $Z_2^+$, $Z_3^+$ and $Z_4^+$ is said ammonium cation.

1. A substrate having a salt according to claim 1 disposed thereon or therein.

* * * * *